United States Patent

Swanson

[15] 3,649,911
[45] Mar. 14, 1972

[54] METER DRIVER CIRCUIT HAVING INTIIAL OVERDRIVE AND MEANS TO DISCHARGE A STORAGE CIRCUIT AT A CONSTANT RATE

[72] Inventor: Hilmer I. Swanson, Quincy, Ill.
[73] Assignee: Harris-Intertype Corporation, Cleveland, Ohio
[22] Filed: Mar. 27, 1970
[21] Appl. No.: 23,371

[52] U.S. Cl. ..........................324/125, 324/123 R, 324/132
[51] Int. Cl..................G01r 1/14, G01r 15/08, G01r 15/10
[58] Field of Search..................324/125, 123, 111, 132, 115

[56] References Cited

UNITED STATES PATENTS

| | | | |
|---|---|---|---|
| 3,492,575 | 1/1970 | Campbell | 324/125 X |
| 2,356,617 | 8/1944 | Rich | 324/125 X |
| 2,567,688 | 9/1951 | Bigelow | 324/125 X |

Primary Examiner—Rudolph V. Rolinec
Assistant Examiner—Ernest F. Karlsen
Attorney—Hill, Sherman, Meroni, Gross & Simpson

[57] ABSTRACT

A meter driver circuit for improving the responsiveness of a meter to an electrical signal being measured. The signal being measured is applied through a first charging circuit which is in series with the meter to apply a temporary pulse to the meter. The pulse temporarily overdrives the meter to overcome the inertia and friction of the meter. The initial pulse decays according to the time constant of the charging circuit. A second charging circuit is provided in the form of a capacitor which is in parallel with the input signal and a transistor which is in parallel with the capacitor. The transistor is biased in such a way as to provide a linear discharge path for the capacitor. The output of the transistor is coupled directly to the meter to provide a linear discharge. By means of the linear discharge circuit, the meter receives increased energy while meeting the F.C.C. specifications.

5 Claims, 4 Drawing Figures

PATENTED MAR 14 1972 3,649,911

INVENTOR.
HILMER I. SWANSON

BY *Hill, Sherman, Meroni, Gross & Simpson*
ATTORNEYS 3,649,911

METER DRIVER CIRCUIT HAVING INITIAL OVERDRIVE AND MEANS TO DISCHARGE A STORAGE CIRCUIT AT A CONSTANT RATE

BACKGROUND OF THE INVENTION

1. Description of the Prior Art

Prior art circuits recognized that meters are inherently slow in responding to electrical signals due to inertia and friction, and circuits have been provided to overdrive a meter initially for the purpose of overcoming the slow meter operation. One such arrangement in the prior art uses two charging circuits, one of which applies an initial high-level pulse to the meter which then decays according to the time constant of the circuit. The second charging circuit applies a signal which decays according to a second time constant. However, both of the signals decay exponentially. By providing a linear decay for one of the charging circuits, the present invention produces an increased output for the meter.

2. Field of the Invention

The field of art to which this invention pertains is meter driver circuits and in particular to circuits for initially overdriving a meter in order to overcome the slow responsiveness of the meter due to its own friction and inertia.

SUMMARY OF THE INVENTION

It is an important feature of the present invention to provide an improved meter driver circuit.

It is another feature of the present invention to provide a meter driver circuit for initially overdriving a meter to overcome its inertia and friction.

It is a principal object of the present invention to provide a meter driver circuit which produces an increase energy output to the meter while fully complying with the F.C.C. specifications.

It is another object of the present invention to provide a meter driver circuit having first and second charging circuits wherein one of the charging circuits has a linear discharge network to increase the energy output to the meter. It is also an object of the present invention to provide a circuit for driving a meter as described above wherein the linear discharge circuit includes an active element such as a transistor.

It is yet another object of the present invention to provide a meter driver circuit to initially overdrive a meter and having first and second charging circuits wherein one of the charging circuits is in series with the meter and the other charging circuit is in parallel with the meter.

It is another object of the present invention to provide a meter driver circuit as described above wherein the first charging circuit causes a decay in the current spike applied to the meter and wherein the decay is exponential in form and the second charging circuit has a linear discharge path producing a combined linearly decaying signal to the meter.

These and other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure.

DESCRIPTION OF THE PREFERRED EMBODIMENT

The present invention relates to a circuit for improving the rapidity of response of a meter and in particular to a circuit for initially overdriving a meter in order to overcome the inertia and friction associated with the meter movement.

Prior art circuits have provided various charging and discharging paths in order to introduce a spike of current to a meter. The F.C.C. has specifications for certain meters. For instance, the F.C.C. may specify that the meter needle shall just hit the 90 percent mark when driven by a signal burst which is between 40 ms. and 90 ms. in duration and of such amplitude to cause 100 percent steady-state reading. The fall time may be specified by stating that the meter needle shall fall to the 10 percent mark from a 100 percent reading within 500 ms. to 800 ms.

The present invention provides a driver circuit for a meter which complies with the F.C.C. standards and which improves the energy delivered to the meter so that less-expensive meters may be used for the indicator requirements. In general, more expensive meters will respond more quickly than less-expensive meters. However, even very expensive meters are slow when compared to a step function pulse.

Prior art circuits have used a driver which has two charging circuits which decay exponentially to meet the F.C.C. requirements. However, the present invention provides a circuit which has a linearly decaying signal and, while meeting the F.C.C. specifications, results in increased energy level to the meter for a longer duration.

Figure 1:
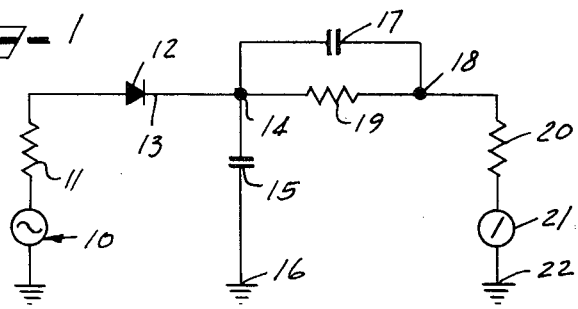
FIG. 1 is a schematic of a prior art meter driver circuit having first and second charging circuits which decay exponentially from a current spike level in order to comply with F.C.C. specifications.

Referring to the drawings in greater detail, FIG. 1 shows a prior art circuit having a pair of charging paths and producing two consecutive exponentially decaying signals for initially overdriving a meter.

The prior art circuit shown in FIG. 1 includes a signal source 10 which is coupled through a resistor 11 to a diode 12. The diode 12 has a cathode 13 which is coupled to a circuit point 14. A first charging circuit which includes a capacitor 15 is coupled from the circuit point 14 to circuit ground at 16. A second charging circuit includes a capacitor 17 which is coupled from the circuit point 14 to a circuit point 18. A resistor 19 is connected in parallel with the capacitor 17. The combination of the capacitor 17 and resistor 19 is coupled in series with a load resistor 20 which in turn is coupled to a meter 21. The meter 21 is coupled to circuit ground at 22.

In operation, a signal burst from the source 10 is coupled through the diode 12 to the circuit point 14. A charge is developed on the capacitor 15 which is in parallel with the source 10, and a burst of current passes through the capacitor 17 to the meter 21. As the capacitor 17 begins to charge, the current to the meter decays exponentially. Also, the discharge of the capacitor 15 through the resistor 19 and the resistor 20 produces a further decaying current through the meter which is also exponential in form.

Figure 2:
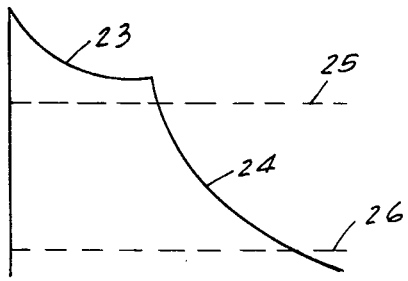
FIG. 2 is a graph illustrating the form of the signal which is applied to the meter in the prior art circuit of FIG. 1.

FIG. 2 shows the current wave shape which is applied to the meter 21 of FIG. 1. The decaying current through the capacitor 17 and the parallel resistor 19 is illustrated by the exponential segment 23. The further decay of the current through the meter by the discharge of the capacitor 15 through the resistors 19 and 20 is indicated by the exponential segment 24. A first dotted line 25 is used to indicate, for instance, the 90 percent meter mark, and the second dotted line 26 is used to indicate the 10 percent meter mark.

Figure 3:
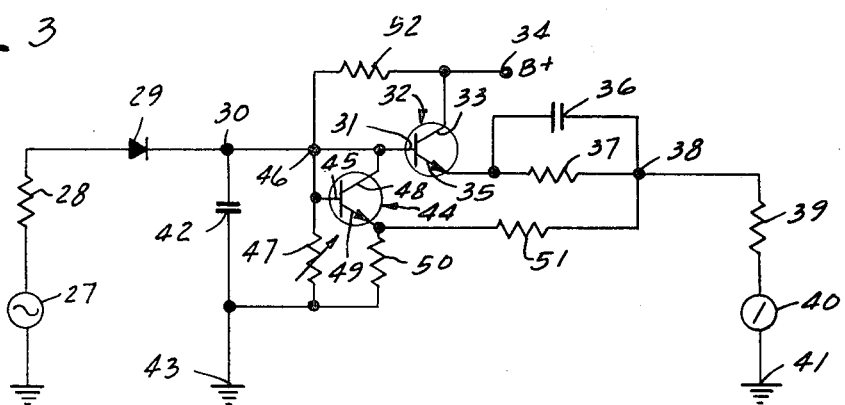
FIG. 3 is a schematic of a meter driver circuit according to the present invention illustrating a series charging path for the meter and a parallel charging path which is discharged through a transistor to produce a linearly decaying current for the meter.

In the embodiment of this invention shown in FIG. 3, the needle meets the fall time specifications of the F.C.C. rules while the meter is held at a higher energy level during the fall time by virtue of a linear discharge circuit of the present invention.

In FIG. 3, a signal source 27 is illustrated. The source 27 couples a signal through a resistor 28 and a diode 29 to a circuit point 30. The signal is then coupled from the circuit point 30 to the base 31 of a transistor 32. The collector 33 of the transistor 32 is coupled to B+ 34. The emitter 35 of the transistor 32 is coupled through a parallel charging circuit including a capacitor 36 and a resistor 37 to a circuit point 38.

The circuit point 38 is then coupled through a further resistor 39 to a meter 40 and from the meter 40 to circuit ground at point 41.

A further charging circuit is coupled to the circuit point 30. In particular, a capacitor 42 is coupled from the point 30 to circuit ground at point 43.

A discharge path for the capacitor 42 is provided by a further transistor 44 which has a base 45 coupled to a circuit point 46. The variable resistor 47 is coupled from the base 45 to circuit ground at the point 43.

The transistor 44 has a collector 48 coupled to the base 31 of the transistor 32 and has an emitter 49 coupled through a resistor 50 to circuit ground at the point 43.

The output of the transistor 44 at the emitter 49 is coupled through a resistor 51 to the circuit point 38 and through the resistor 39 to the meter 40 and ground at 41. The base of the transistor 44 is also coupled to B+ at 34 through a bias resistor 52 the capacitor 42 in connection with the diode 29 and the resistor 28 may be referred to as a peak storing circuit which responds to the source 27.

In operation, the circuit of FIG. 3 couples a signal from the source 27 directly through the transistor 32 to the charging circuit which includes the capacitor 36 and the resistor 37. The signal is then connected to the meter 40 as shown. The meter is thereby provided with a spike of current which decays in accordance with the charging of the capacitor 36. The decay is exponential as determined by the time constant of the capacitor 36 and resistor 37.

A second charging circuit is provided by the capacitor 42, and the turning on of the transistor 44 causes the capacitor 42 to discharge. Furthermore the discharge of the capacitor 42 through the transistor 44 produces a linear current through the resistors 51 and 39 to the meter 40.

Figure 4:
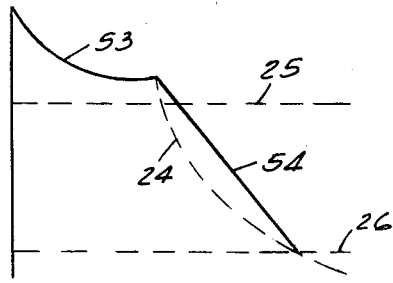
FIG. 4 is a graph illustrating the form of discharge curve of the circuit shown in FIG. 3.

The shape of the discharge curve of the circuit shown in FIG. 3 is illustrated generally in FIG. 4. In particular, the exponential decay provided by the parallel capacitor 46 and resistor 37 is illustrated by the exponential segment 53. The further decay due to the discharge of the capacitor 42 through the transistor 44 is shown by the linear segment 54. The corresponding exponential segment 24 of FIG. 2 is illustrated also in dotted lines in FIG. 4. Also, the 90 percent needle mark is indicated by the dash line 25 and the 10 percent needle mark is indicated by the dash line 26 corresponding to the similarly numbered dash lines of FIG. 2. As shown in FIG. 4, the linear discharge path 54 causes the entire current pulse to have a greater area and therefor a greater energy than the pulse shown in FIG. 2 and illustrated by the dotted line 24 in FIG. 4. Accordingly, the circuit of the present invention provides an improved meter driver and allows the use of less expensive meters by overcoming the friction and inertia of the meter movement.

I claim as my invention:

1. A meter driver circuit comprising:
   a peak storing circuit responding to a source under test,
   a meter,
   means responsive to the output of the peak storing circuit including a capacitor in series with the meter and an active switching element for applying current to the capacitor for applying an initial overdriving signal to the meter,
   means shunting the peak storing circuit for discharging the peak storing circuit at a constant rate and for applying a signal having a constant rate of decline to the meter.

2. A meter driver circuit in accordance with claim 1 wherein said peak storing circuit includes a capacitor coupled in parallel with the source under test.

3. A meter driver circuit in accordance with claim 1 wherein said active switching element comprises a transistor and wherein the transistor is controlled by the source under test.

4. A meter driver circuit in accordance with claim 1 wherein the means shunting the peak storing circuit includes a transistor and a resistive element in series therewith.

5. A meter driver circuit in accordance with claim 4 wherein the active switching element is also a transistor and wherein the output of the transistor which shunts the peak storing circuit is coupled to a common circuit point with the common circuit point being an input to the other transistor.

* * * * *